US006487716B1

(12) United States Patent
Choi et al.

(10) Patent No.: US 6,487,716 B1
(45) Date of Patent: Nov. 26, 2002

(54) METHODS AND APPARATUS FOR OPTIMIZING PROGRAMS IN THE PRESENCE OF EXCEPTIONS

(75) Inventors: Jong-Deok Choi, Mount Kisco, NY (US); Manish Gupta, Peekskill, NY (US); Michael Hind, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/415,137

(22) Filed: Oct. 8, 1999

(51) Int. Cl.[7] .................................................. G06F 9/44
(52) U.S. Cl. ...................... 717/159; 717/147; 717/148; 717/159; 712/244
(58) Field of Search ................... 717/4–9, 140–161; 707/206; 712/244

(56) References Cited

U.S. PATENT DOCUMENTS

| | | | | |
|---|---|---|---|---|
| 5,778,233 A | * | 7/1998 | Besaw et al. .................... | 717/9 |
| 5,799,179 A | | 8/1998 | Ebcioglu et al. | |
| 6,031,992 A | * | 2/2000 | Cmelik et al. ................... | 717/5 |
| 6,081,665 A | * | 6/2000 | Nelsen et al. .................... | 717/5 |
| 6,113,651 A | * | 9/2000 | Sakai et al. ...................... | 717/6 |
| 6,247,172 B1 | * | 6/2001 | Dunn et al. ...................... | 717/5 |
| 6,314,555 B1 | * | 11/2001 | Ndumu et al. ................... | 717/1 |
| 6,343,375 B1 | | 1/2002 | Gupta et al. | |

OTHER PUBLICATIONS

U.S. patent application Ser. No. 09/323,989, Choi et al., filed Jun. 2, 1999.

J.–D. Choi et al., "Efficient and Precise Modeling of Exceptions for the Analysis of Java Programs," ACM SIGPLAN –SIGSOFT Workshop on Program Analysis for Software Tools and Engineering, pp. 1–11, Sep. 6, 1999.

C. Chambers et al., "Dependence Analysis for Java," Proceedings of the 12th International Workshop on Languages and Compilers for Parallel Computing, San Diego, 18 pages, Aug. 1999.

B.C. Le, "An Out–of–Order Execution Technique for Runtime Binary Translators," Proceedings of the 8th International Conference on Architectural Support for Programming Languages and Operating Systems, pp. 151–158, Oct. 1998.

D.I. August et al., "Integrated Predicated and Speculative Execution in the IMPACT EPIC Architecture," Proceedings of 25th International Symposium on Computer Architecture, pp. 227–237, Jul. 1998.

K. Ebcioglu, "Some Design Ideas for a VLIW Architecture for Sequential Natured Software," Parallel Processing, M. Cosnard et al. (editors), pp. 3–21, North Holland, 1998.

K. Ebcioglu et al., "DAISY: Dynamic Compilation for 100% Architectural Compatibility," Proceedings of 24th International Symposium on Computer Architecture, pp. 26–37, Denver, CO, Jun. 1997.

(List continued on next page.)

Primary Examiner—Tuan Q. Dam
Assistant Examiner—Chuck Kendall
(74) Attorney, Agent, or Firm—Douglas W. Cameron; Ryan, Mason & Lewis, LLP

(57) ABSTRACT

A method and several variants are provided for analyzing and transforming a computer program such that instructions may be reordered even across instructions that may throw an exception, while strictly preserving the precise exception semantics of the original program. The method uses program analysis to identify the subset of program state that needs to be preserved if an exception is thrown. Furthermore, the method performs a program transformation that allows dependence constraints among potentially excepting instructions to be completely ignored while applying program optimizations. This transformation does not require any special hardware support, and requires a compensation code to be executed only if an exception is thrown, i.e., no additional instructions need to be executed if an exception is not thrown. Variants of the method show how one or several of the features of the method may be performed.

25 Claims, 5 Drawing Sheets

OTHER PUBLICATIONS

J. Gosling et al., Chapter 11, Exceptions, "The Java Language Specification (Java Series)," Addison–Wesley Publishing Company, Reading, MA, pp. 201–213, 1996.

A. Aiken et al., "Safe: A Semantic Technique for Transforming Programs in the Presence of Errors," ACM Transactions on Programming Languages and Systems, 17(1):63–84, Jan. 1995.

S. Mahlke et al., "Sentinel Scheduling: A Model for Compiler–Controlled Speculative Execution," ACM Transactions on Computer Systems, 11(4):376–408, Nov. 1993.

K. Ebcioglu et al., "An Architectural Framework for Supporting Heterogeneous Instruction–Set Architectures," IEEE Computer, 26(6), pp. 39–56, Jun. 1993.

P.P. Chang et al., "IMPACT: An Architectural Framework for Multiple–Instruction–Issue Processors," Proceedings of $18^{th}$ International Symposium on Computer Architecture, pp. 266–275, 1991.

M.D. Smith et al., "Boosting Beyond Static Scheduling in a Superscaler Processor," Proceedings of $19^{th}$ International Symposium on Computer Architecture, pp. 344–354, May 1990.

* cited by examiner

FIG. 3

```
public class EXCEPT {
  int f, g;
  static void foo(int a [], int b [], int i, EXCEPT p) {
    a[i] = p.f + p.g;
    b[i] = p.g;
  }
}
```

FIG. 4

| Bytecode Offset | Operator | | Operands | Dependence Graph Node |
|---|---|---|---|---|
| | | Label | B0 | |
| 3 | PEI | null_check | c1=p | P1 |
| 3 | | int_load | t0=@{p,-16},<EXCEPT.f>,[c1] | n2 |
| | | Int_load | t1=@{p,-20},<EXCEPT.g>,[c1] | n3 |
| 10 | | int_add | t2=t0,t1 | n4 |
| 11 | PEI | null_check | c2=a | P5 |
| | | Int_load | t5=@{a,-4}, [c2] | n6 |
| 11 | PEI | trap_if | c3=t5,i,<=U,[c2] | P7 |
| | | Int_shl | t6=i,2,[c2,c3] | n8 |
| 11 | | int_store | t2,@{a,t6},[c2,c3] | n9 |
| 18 | PEI | null_check | c4=b | P10 |
| | | Int_load | t7=@{b,-4},[c4] | n11 |
| 18 | PEI | trap_if | c5=t7,i,<=U,[c4] | P12 |
| | | Int_shl | t8=i,2,[c4,c5] | n13 |
| 18 | | int_store | t1,@{b,t8},[c4,c5] | n14 |
| 19 | | return | | n15 |
| | | end_block B0 | | |

METHODS AND APPARATUS FOR OPTIMIZING PROGRAMS IN THE PRESENCE OF EXCEPTIONS

FIELD OF THE INVENTION

The present invention generally relates to computer programming, and, in particular, to methods and apparatus for a compiler (either static or dynamic), programming development environment or tool, or programmer to enable transformations of a program that involve code motion across instructions that may throw an exception, while strictly preserving the precise exception semantics of the program or parts of the program that existed before the transformation.

BACKGROUND OF THE INVENTION

The present invention describes methods and apparatus for a compiler, programming development environment or tool, or programmer to enable transformation of a program or parts of a program written in some machine language so as to eliminate or reduce the impact of precise exceptions on optimizations that require instruction reordering.

Some programming languages, for example, Java™ (e.g., see J. Gosling, B. Joy, G. L. Steele, "The Java Language Specification (Java Series)," Addison-Wesley Publishing Company, Reading, Mass. 1996), Ada, Modula-3, and C++ support exceptions, which represent abnormal execution conditions arising, for instance, out of violations of the semantic constraints of the language. We shall refer to an exception as being thrown or raised at a point where it occurs, and as being caught at the exception handler, which is the point to which control is transferred when the exception is thrown. The actual mechanism for determining where the control is transferred in case of an exception being thrown is part of the specification of a programming language. For example, Java™ defines try-catch blocks that govern control flow when an exception is thrown by a statement—execution proceeds to the closest dynamically enclosing catch block that handles the exception. An exception may be thrown explicitly, such as via a throw statement in Java™, or implicitly, based on checks defined by the programming language. For instance, Java™ defines some runtime exceptions such as NullPointerException, IndexOutOfBoundsException, and ArithmeticException, and many instructions such as array-access instructions, object field-access instructions, and integer division instructions may throw one of the predefined runtime exceptions. We refer to an instruction that may throw an exception as a potentially excepting instruction (PEI in short).

In some languages, like Java™, exceptions are defined to be precise, which implies that:
1) exception(s) must be thrown in the same order as specified by the original program; and
2) when an exception is thrown, the program state observable at the entry of the corresponding exception handler must be the same as in the original program.

Compilers often use a representation called the Dependence Graph to represent constraints on code motion and instruction reordering. The nodes in a dependence graph typically represent statements, and edges represent dependence constraints. Compilers for languages supporting precise exceptions satisfy the precise exception requirement by imposing the following dependence constraints, described further in J.-D. Choi, D. Grove, M. Hind, and V. Sarkar, "Efficient and precise handling of exceptions for analysis of Java programs," ACM SIGPLAN-SIGSOFT Workshop on Program Analysis for Software Tools and Engineering, September 1999:
1) dependences among PEIs, referred to as exception-sequence dependences, which ensure that the correct exception is thrown by the code, and
2) dependences between writes to non-temporary variables and PEIs, referred to as write-barrier dependences, which ensure that a write to a non-temporary variable is not moved before or after a PEI, in order to maintain the correct program state if an exception is thrown. These dependences hamper a wide range of program optimizations in the presence of PEIs, such as instruction scheduling, instruction selection (across a PEI), loop transformations, and parallelization. This impedes the performance of programs written in languages like Java™, in which PEIs are quite common.

A reference to a variable is said to be live at a program point if the value of the variable is used after that program point on some control flow path to the exit before it is redefined.

Let us use the Java code segment shown in FIG. 3 as an example. FIG. 4 shows the low-level intermediate representation (LIR) of the Java code in FIG. 3. Compilers frequently use LIR representation of the input program, similar to the LIR in FIG. 4, during the analysis and optimization of the program. FIG. 5 shows the dependence graph of the LIR in FIG. 4. Compilers frequently use dependence graphs, similar to FIG. 5, for analysis and optimization of programs. We define the dependence locus of a node $N_i$ in the dependence graph to be the set of nodes that are transitively reachable from $N_i$ via dependence edges. Each node in the dependence graph corresponds to a statement (i.e., line) in the LIR. The column titled Dependence Graph Node in the LIR shows the corresponding node in the dependence graph of the statement.

In the dependence graph in FIG. 5, exception-sequence dependences are shown as dashed lines, while write-barrier dependences are shown as dotted edges, such as from n9 to P10. The longest path of the graph shown in the figure has a length of 10: P1, P5, n6, P7, n8, n9, P10, n11, P12, n13, and n14.

A program with more than one thread (locus of control) is said to be multithreaded. In a multithreaded application, the shared program state when an exception is thrown can be visible not only to the exception handler, if any exists, of the exception-throwing thread, but also potentially to any other threads that can access the program state. Furthermore, an exception not caught by a handler terminates only the exception-throwing thread, and other threads can still access the shared program state affected by the terminating thread and continue their execution.

Allowing for uncontrolled accesses (read or write) to shared program state by multiple threads usually renders a program incorrect or, at best, hard to understand and develop. Most languages, therefore, provide mechanisms for controlling accesses to shared program state, i.e., shared variables. A synchronized region, such as a synchronized block or method in Java, is used in which to access a shared variable. Some languages go even further to specify that for a program to be correct, accesses to shared variables should be controlled "properly," usually implying that the program should obey the CREW protocol—Concurrent Read, Exclusive Write. In a CREW protocol, there can be as many concurrent read accesses as long as there is no concurrent write access, but no read or write accesses can be concurrent with another write access to the same variable. We refer to languages that force parallel programs to obey the CREW protocol or which do not specify any constraints on the ordering of data accesses in regions not obeying the CREW protocol, as languages supporting weak consistency. We refer to other languages, which do impose constraints on the ordering of data accesses even in regions not obeying the CREW protocol, as supporting strong consistency.

Many compilers use a representation called a call graph to analyze an entire program. A call graph has nodes representing procedures, and edges representing procedure calls. We use the term procedure to refer to subroutines, functions, and also methods in object-oriented languages. A direct procedure call, where the callee (called procedure) is known at the call site, is represented by a single edge in the call graph from the caller to the callee. A procedure call, where the callee is not known, such as a virtual-method call in an object-oriented language or an indirect call through a pointer, is represented by edges from the caller to each possible callee. It is also possible that given a particular (callee) procedure, all callers of it may not be known. In that case, the call graph would conservatively put edges from all possible callers to that callee.

A topological sort order enumeration of nodes in a graph refers to an enumeration in which, if the graph contains an edge from node x to node y, then x appears before y. If a graph has cycles, then such an enumeration is not guaranteed for nodes involved in a cycle. A reverse topological sort order lists nodes in the reverse order of a topological sort.

Prior art for a similar goal of allowing instruction reordering in the presence of exceptions can be found in the papers: D. August, D. Connors, S, Mahike, J. Sias, K. Crozier, B.-C. Cheng, P. Eaton, Q. Olaniran, and W.-M. Hwu, "Integrated predicated and speculative execution in the IMPACT EPIC architecture," *Proceedings of 25th International Symposium on Computer Architecture,* July 1998; P. Chang, S. Mahlke, W. Chen, N. Water, and W.-M. Hwu, "IMPACT: An architectural framework for multiple-instruction-issue processors," *Proceedings of 18th International Symposium on Computer Architecture,* pages 266–275, 1991; K. Ebcioglu, "Some design ideas for a VLIW architecture for sequential natured software," *Parallel Processing,* pages 3–21, M. Cosnard et al. (editors), North Holland, 1988; K. Ebcioglu and G. Silberman, "An architectural framework for supporting heterogeneous instruction-set architectures," *IEEE Computer,* 26(6), pages 39–56, June 1993; K. Ebcioglu and E. R. Altman, "DAISY: Dynamic compilation for 100% architectural compatibility," Proceedings of 24*th International Symposium on Computer Architecture,* pages 26–37, Denver, Colo., June 1997; S. Mahlke, W. Chen, R. Bringmann, R. Hank, W.-M. Hwu, B. Rau, and M. Schlansker, "Sentinel scheduling: A model for compiler-controlled speculative execution," *ACM Transactions on Computer Systems,* 11(4):376–408, November 1993; M. Smith, M. Lam, and M. Horowitz, "Boosting beyond static scheduling in a superscalar processor," *Proceedings of* 19*th International Symposium on Computer Architecture,* pages 344–354, May 1990; and in U.S. Pat. No. 5,799,179 to K. Ebcioglu and G. Silberman entitled "Handling of exceptions in speculative instructions," issued on Aug. 25, 1998. These methods differ from the method described in this invention, at least, in that they require special hardware support to ensure that the results of speculatively executed instructions that raise an exception are not committed prematurely. Furthermore, these methods do not attempt to reduce the program state that must be preserved at a possible exception point.

Prior art for aggressive code motion of instructions, including PEIs, can be found in K. Ebcioglu, "Some design ideas for a VLIW architecture for sequential natured software," *Parallel Processing,* pages 3–21, M. Cosnard et al. (editors), North Holland, 1988. The method presented in this Ebcioglu article has the drawback of requiring special hardware support for extra instruction opcodes to indicate a non-speculative or speculative version, and an extra bit in the registers to denote a "bottom" result from an instruction that causes an exception.

Prior art for aggressive code motion of instructions, including PEIs, can be found in M. Smith, M. Lam, and M. Horowitz, "Boosting beyond static scheduling in a superscalar processor," *Proceedings of* 19*th International Symposium on Computer Architecture,* pages 344–354, May 1990. The method presented in this Smith et al. article has the drawback of requiring expensive hardware support in the form of shadow register files and shadow store buffers to hold the result of speculative instructions.

Prior art for aggressive code motion of instructions, including PEIs, can be found in P. Chang, S. Mahlke, W. Chen, N. Water, and W.-M. Hwu, "IMPACT: An architectural framework for multiple-instruction-issue processors," *Proceedings of* 18*th International Symposium on Computer Architecture,* pages 266–275, 1991. The method presented in this Chang et al. article has two drawbacks: (i) it requires hardware support for silent exceptions, i.e., for ignoring exceptions thrown by speculatively executed instructions, and (ii) it may fail to throw an exception that is thrown by the original, unoptimized program, which would constitute a violation of program semantics in a language like Java™.

Prior art for aggressive code motion of instructions, including PEIs, can be found in S. Mahlke, W. Chen, R. Bringmann, R. Hank, W.-M. Hwu, B. Rau, and M. Schlansker, "Sentinel scheduling: A model for compiler-controlled speculative execution," *ACM Transactions on Computer Systems,* 11(4):376–408, November 1993. This method also has the drawback of requiring special hardware support in the form of extra bit on registers to record whether a speculative instruction caused an exception, as well as an extra bit in the instruction opcode to distinguish between speculative and non-speculative instructions.

Prior art for aggressive code motion of instructions, including PEIs, can be found in K. Ebcioglu and G. Silberman, "An architectural framework for supporting heterogeneous instruction-set architectures," *IEEE Computer,* 26(6), pages 39–56, June 1993 and K. Ebcioglu and E. R. Altman, "DAISY: Dynamic compilation for 100% architectural compatibility," *Proceedings of* 24*th International Symposium on Computer Architecture,* pages 26–37, Denver, Colo., June 1997. The methods presented in these Ebcioglu articles have the drawback of requiring special hardware support for non-architected registers to hold the results of operations executed out of order.

Prior art for aggressive code motion of instructions, including PEIs, can be found in U.S. Pat. No. 5,799,179 to K. Ebcioglu and G. Silberman entitled "Handling of exceptions in speculative instructions," issued on Aug. 25, 1998. The method presented in this Ebcioglu et al. patent has the drawback of requiring special hardware support in the form of extra bits in registers for exception tracking and recovery.

Prior art for aggressive code motion of instructions, including PEIs, without requiring any special hardware support, can be found in B. C. Le, "An out-of-order execution technique for runtime binary translators," *Proceedings of the* 8*th International Conference on Architectural Support for Programming Languages and Operating Systems,* pages 151–158, October 1998. However, this method requires the generation of check-pointing code, which contributes to the overhead of executing extra instructions even when no exception is thrown. This overhead of check-pointing can potentially be high.

Prior art for aggressive program transformations in the presence of exceptions can be found in A. Aiken, J. W. Williams, and E. L. Wimmers, "Safe: A semantic technique for transforming programs in the presence of errors," *ACM Transactions on Programming Languages and Systems*, 17(1):63–84, January 1995. This method defines a higher-order function called Safe, which is used to annotate parts of the program that are guaranteed not to produce errors or exceptions. This method is not applicable to many computations, where it cannot be guaranteed that exceptions will not take place, even if exceptions are rare.

Prior art for aggressive program transformations in the presence of exceptions can be found in U.S. Pat. No. 6,343,375, issued on Jan. 29, 2002 to M. Gupta, S. Midkiff, and J. Moreira, and entitled "Method for optimizing array bounds checks in programs." This method performs a program transformation to create safe regions in which no exception may take place. However, this method is only applicable to a restricted class of computations using arrays, and can only be used to handle out-of-bounds array index exceptions and null-pointer exceptions. For many computations, no such safe regions can be created using this method.

SUMMARY OF THE INVENTION

The present invention provides methods and apparatus to analyze and transform a computer program so as to enable program transformations which require code motion across potentially excepting instructions, while strictly preserving the precise exception semantics of the original program. Examples of program transformations that benefit from our method include instruction scheduling, instruction selection across a PEI, loop transformations to improve data locality and instruction-level parallelism, and program parallelization. Thus, the transformations enabled by this invention are important to improve the performance of the program being transformed, and also to decrease the execution time of other programs executing on the system.

In a first aspect of the invention, a method of optimizing a computer program written in a language that supports exceptions, comprises the steps of: (i) identifying in the computer program a statement that writes into a variable and a statement corresponding to a potentially excepting instruction; and (ii) removing a constraint on moving the write statement across the potentially excepting instruction when the variable written by the write statement is determined to be not live at an exception handler that catches the exception when thrown.

In a second aspect of the invention, a method of optimizing a computer program written in a language that supports exceptions, comprises the steps of: (i) transforming each code region to be optimized by performing optimizations without any constraints on ordering between potentially excepting instructions; and (ii) generating compensation code which executes only if an exception is thrown by the region transformed in the transforming step.

A preferred method of the present invention first performs a static analysis of the program to identify the types of exceptions possibly thrown in the program, and to determine the liveness of variables at entry to different exception handlers in the program. The method then performs two transformations on the program, which deal respectively with overcoming write-barrier dependences and exception sequence dependences involving PEIs.

The first transformation adds a parameter to each procedure being optimized, which encodes the information about liveness of variables at each dynamically enclosing exception handler for the given procedure call. This information is used at runtime to select one of two versions of the procedure generated by the compiler as follows. The first version is applicable when no variable written in the procedure, other than the implicit exception object, is live at any exception handler (dynamically enclosing the procedure call) which could catch an exception thrown during the procedure call; the second version is selected otherwise. The first version of the procedure, which we shall refer to as the specialized version, is optimized by the compiler while completely ignoring all write-barrier dependences involving PEIs in code regions inside it without any local exception handler. The program optimizations in the second version, which is the original procedure and is referred to as the normal version, remain constrained by the write-barrier dependences due to PEIs. Thus, in cases where the runtime information obtained using our method allows the specialized version of the procedure to be selected during execution, better performance can be obtained due to more effective optimizations.

For multithreaded programs, our preferred method performs the following additional analysis. If the programming language supports weak consistency and if the code region being optimized is part of a synchronized region, no further write-barrier dependences are imposed. However, if either the programming language supports strong consistency or if the code region is inside a synchronized region, our method performs analysis to detect thread-local variables. In this case, write-barrier dependences are honored between PEIs and writes of variables that are not thread-local.

The second transformation is performed, in a preferred method of the invention, on the specialized version of a procedure. This transformation further creates two regions out of the code region to which it is applied. The first region, called the optimized code, is obtained by allowing optimizations that completely ignore all exception-sequence dependences in the original region. The second region, called the compensation code, intercepts any exception thrown in the optimized region, and throws the correct exception that would have been thrown by the original, unoptimized code. This compensation code is executed only if and when an exception is thrown during the execution of the optimized code. Hence, in the common case where the execution of the program leads to no exception being thrown, this transformation allows the program to be optimized, completely ignoring all exception-sequence dependences, without the overhead of executing any part of the compensation code.

An alternative embodiment of the method uses a different analysis to overcome the write-barrier dependences due to PEIs. In this embodiment, no extra parameter is added to procedures. Instead, the analysis to record the liveness information of variables at enclosing exception is done at compile time, using the call graph representation of the program. The information about exception handlers, if any, surrounding a procedure call from A to B is propagated to B and to all procedures reachable in the call graph from B (representing all procedures transitively called from B). In this embodiment, there is no need to create a specialized version of the procedure. All write-barrier dependences related to PEIs that do not have a non-trivial enclosing exception handler, are ignored. In the special case where the static analysis shows that a procedure cannot have any dynamically enclosing exception handler with live variables, those regions of code in that procedure which do not have an exception handler block within the procedure, can be viewed as write-barrier-free regions. These regions are optimized while ignoring all write-barrier dependences.

Another alternative embodiment of the method performs the transformation to eliminate exception-sequence dependences on both the specialized version (without write-barrier dependences) and the normal version (with write-barrier dependences) of the procedure, in order to get the benefits of overcoming exception-sequence dependences regardless of the need to preserve the values of variables at potential exception points in the procedure.

Other embodiments of the method perform the analysis and transformations at run time, in a dynamic compiler. A variant of this embodiment does not create the compensation code, which ensures that the correct exception is thrown, during code generation time. It generates the compensation code only on demand, if an exception is thrown in the optimized code. Similarly, another variant of the method does not initially generate two versions of the procedure code in order to overcome the write-barrier dependences. It generates code for only the version (write-barrier-free or the original code) that will be executed, based on the expected information about liveness of variables at enclosing exception handlers for the given procedure call, and generates code for the other version on demand, if needed.

Another embodiment of the method computes and uses information about the set of live variables at entry to each exception handler at a finer granularity. This embodiment imposes write-barrier dependences for each PEI separately, based on information about the set of variables that are live at the exception handler(s) for the exception possibly thrown by that PEI.

BRIEF DESCRIPTION OF THE DRAWINGS

The foregoing and other objects, aspects and advantages will be better understood from the following detailed description of a preferred embodiment of the invention with reference to the drawings, in which:

FIG. 3 shows an example program to illustrate methods of the invention;

FIG. 4 shows an intermediate representation of the example program of FIG. 3;

DETAILED DESCRIPTION OF PREFERRED EMBODIMENTS

Figure 1A:
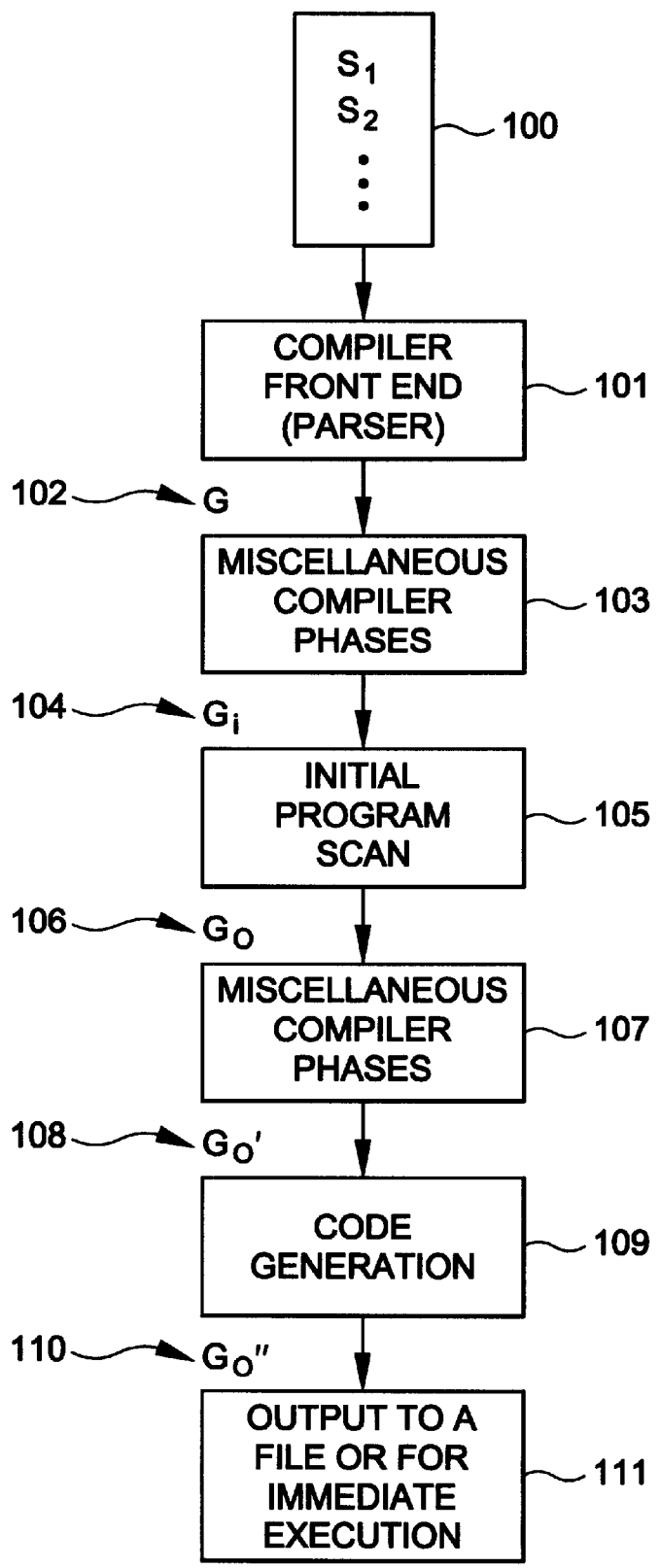
FIG. 1A shows a block diagram of a compiler or compilation system that uses a method of this invention.

Referring now to the drawings, and more particularly to FIG. 1A, there is shown an embodiment of the invention. A computer program 100 has been transformed into a list of instructions 102 by the front end or parser 101. The list of instructions can be represented by a graph G whose nodes are operations on variables, and whose edges represent the flow of control between instructions. It is not necessary that they be encoded as such, and may be encoded as records in a file, as a logically flat structure, or by other means. The instructions are the instruction set of an intermediate compiler language or machine. The labels of the graph contain auxiliary information about the edges and nodes in the graph. Some of the instructions at nodes on the graph are references to variables in the program. References may be either reads or writes. Another type of operation of interest is a procedure invocation. Each instruction can optionally be enclosed by a sequence of exception handlers.

The list of instructions 102 is optionally consumed by compiler, programming tool, or programming development operations that may precede the Initial Program Scan and Code Generation phases. These optional phases may or may not transform the instruction stream encoded in G. The output of these phases is referred to as Gi 104, and is consumed by the Initial Program Scan 105. The Initial Program Scan phase transforms the program representation into $G_o$ 106 by marking each procedure and call site with exception handler information. The Initial Program Scan phase is discussed in more detail below, and in pseudocode lines 201 to 230, below. The Code Generation phase 109, that is preceded by the Initial Program Scan phase and possibly by some other optional compiler phases 107, generates code that is aggressively optimized regarding exceptions, as discussed in more details below, and in pseudocode lines 401 to 527, and which transforms $G_{o'}$ 108, producing $G_{o''}$ 110. The information of value to future passes is contained in $G_{o''}$ 110, which is then passed to later compiler passes 111 as shown in FIG. 1A.

Figure 1B:
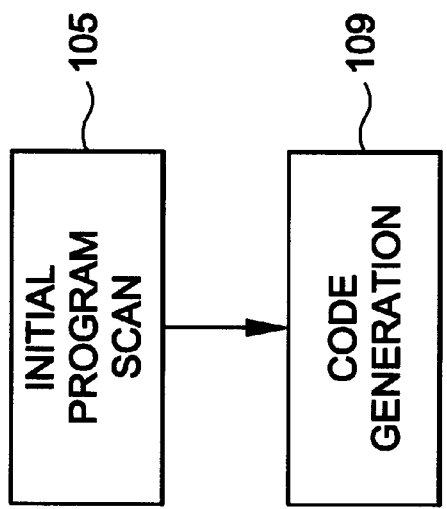
FIG. 1B shows a block diagram of a method of this invention.

FIG. 1B is a block diagram illustrating the two phases, Initial Program Scan and Code Generation, to be described in detail below in accordance with the invention. As will be explained, the initial program scan methodology 105 is first performed followed by the code generation methodology 109.

Figure 2:
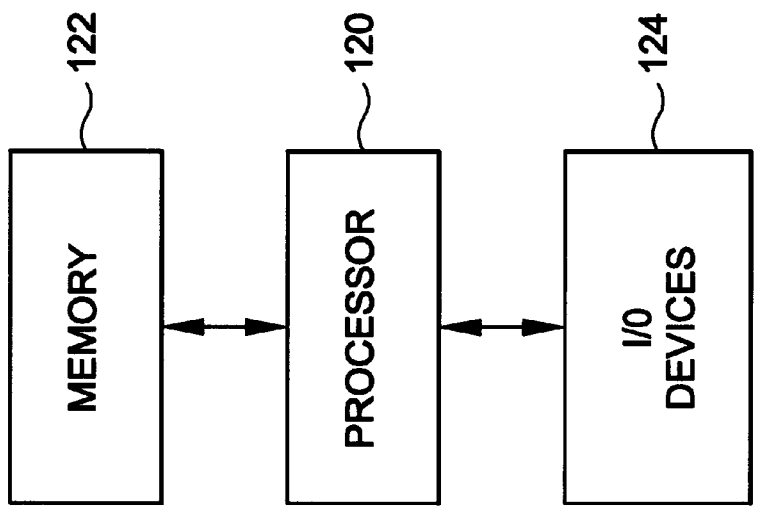
FIG. 2 shows a block diagram of an exemplary computer system for implementing this invention.

FIG. 2 is a block diagram illustrating an exemplary computer system for implementing this invention. The computer system may comprise a processor 120 operatively coupled to memory 122 and I/O devices 124. It is to be appreciated that the term "processor" as used herein is intended to include any processing device, such as, for example, one that includes a CPU (central processing unit). The term "memory" as used herein is intended to include memory associated with a processor or CPU, such as, for example, RAM, ROM, a fixed memory device (e.g., hard drive), a removable memory device (e.g., diskette), flash memory, etc. In addition, the term "input/output devices" or "I/O devices" as used herein is intended to include, for example, one or more input devices, e.g., keyboard, for inputting data to the processing unit, and/or one or more output devices, e.g., CRT display and/or printer, for presenting results associated with the processing unit. It is also to be understood that "processor" may refer to more than one processing device and that various elements associated with a processing device may be shared by other processing devices. Accordingly, software components including instructions or code for performing the methodologies of the invention, as described herein, may be stored in one or more of the associated memory devices (e.g., ROM, fixed or removable memory) and, when ready to be utilized, loaded in part or in whole (e.g., into RAM) and executed by a CPU.

Initial Program Scan

The Initial Program Scan produces two sets of bit vectors. One set contains a bit vector for each procedure, p, called $Except_p$, which holds information about the types of exceptions possibly thrown by procedure p. The other set contains a bit vector for each call site, c, called $EEH_c$, which holds information about certain kinds of exception handlers (described below) that dynamically enclose the call site. These bit vectors are used in the Code Generation phase 109. Details of these phases are now described.

Lines 301–306. If so, $EEH_{init}$ is initialized to 1, which in turn would cause all bits of $EEH_c$ to be initialized to 1 on line 218. Lines 217–224 determine which call sites are enclosed by exception handlers that catch a specific exception and are

```
201: InitialProgramScan(G)
202:    Build call-graph, CallG, of program represented by G
203:    for each node, p, in CallG do    // for each procedure
204:       set all bits of Except_p to 0
205:       for each instruction, i, in p do
206:          for each predefined exception, e, that i may throw do
207:             set the e bit of Except_p to 1
208:          end do
209:       end do
210:    end do
211:    EEH_init = 0
212:    for each default handler h that deals with uncaught exceptions
213:       if isNonTrivialHander(h) then
214:          EEH_init = 1; break;
215:       end if
216:    end do
217:    for each call site, c, in p do
218:       set all bits of EEH_c to EEH_init
219:       for each exception handler, h, enclosing c do
220:          if isNonTrivialHander(h) then
221:             set the h bit for EEH_c to 1
222:          end if
223:       end do
224:    end do
225:    Set WorkList = enumeration of nodes in CallG in reverse topological sort order
226:    while WorkList not empty do
227:       Get first element p and delete it from WorkList
228:       for each edge (p, q) in CallG do    // for each call to procedure q in p
229:          if Except_p != (Except_p|Except_q) then    // "|" denotes bit-wise OR
230:             Except_p = Except_p|Except_q
231:             for each edge (r, p) in CallG do    // for each caller r of p
232:                add r to WorkList if it is not already present
233:             end do
234:          end if
235:       end do
236:    end do
301: isNonTrivialHandler(h)
302:    if (handler h does not use a variable visible outside the handler other than the exception
          object and the entry to h is post-dominated by a call to system exit or
          termination of the current thread) then
303:       return false
304:    else
305:       return true
306:    end if
```

Lines 201–236 describe the Initial Program Scan phase. Line 202 builds a call graph representation of the program. Lines 203–210 determine what predefined exceptions may be thrown directly by a procedure and represent this information in the bit vector Except for that procedure. Lines 225–236 later propagate this information interprocedurally using a worklist so that each caller includes the list of exceptions thrown by any callee procedure that is called by it. Lines 211–216 determine the behavior of each procedure that may finally handle an exception not caught by any exception handler. For example, in the Java™ language, an exception which is not caught by an exception handler is handled by executing a special procedure, the uncaughtException method of the thread group. Java™ also allows user code to override the uncaughtException method. Line 213 checks if the default handler is non-trivial (as defined by non-trivial (as defined by lines 301–306). This information is stored in the bit vector for that call site, $EEH_c$. In a preferred embodiment, this information is propagated across procedures dynamically during execution, as described later.

The check for whether an exception handler is non-trivial (indicating that some user-defined variable, visible to the code where the corresponding PEIs appear, may be live at entry to this exception handler) is done in lines 301–306. Line 302 checks if the handler does not use the values of variables visible outside the handler and if it is definitely followed by a system exit. In this case, the procedure isNonTrivialHandler returns false. Otherwise, it conservatively returns true.

Code Generation

```
401: Code Generation()
402:    for each procedure, m, in program do
```

-continued

```
403:   generate code to introduce an additional parameter PEEH_m, which is a bit vector
       of predefined exceptions initialized to zero.
404:   for each call site, c, calling procedure n, do
405:      generate code to compute Dyn_c = EEH_c|PEEH_m
406:      generate code to pass the computed value, Dyn_c, as the actual parameter
          corresponding to PEEH_n at c.
407:      generate dynamic dispatch code that will bitwise and the computed value,
          Dyn_c, with the Except_n. If the result is all zeroes, generate code to call the
          specialized version of n, otherwise the normal version of n.
408:   end do
409:   generate code for two versions of m
          Normal version, which honors all write-barrier dependences.
          Specialized, which ignores write-barrier dependences in code regions inside it
          without any local exception handler, and is transformed further, as described in
          lines 500–527.
410:   end do
```

Lines 401–410 describe the Code Generation phase. Line 403 generates code to allow all procedures to accept an additional parameter, $PEEH_m$, which is a bit vector of predefined exceptions, similar to $Except_m$ and $EEH_c$. Lines 404–408 visit each call site, c, in a procedure. Line 405 generates code to take the bitwise or of the precomputed $EEH_c$ (lines 210–215) and $PEEH_m$. The result of this operation, $Dyn_c$, captures properties concerning how exceptions are caught by handlers in calling procedures. This value is passed as an additional parameter at c (line 406). It is also used to generate dynamic dispatch code (line 407). This generated code will take the bitwise and of $Dyn_c$ with $Except_n$, where n is the called procedure at c. The code generated will call the specialized version of n when the result of this operation is all zeroes. Otherwise, it will call the normal version of n. Finally, at line 409, two versions of code for the procedure m are generated. The Normal version is the code generated by the compiler while honoring all write-barrier and exception-sequence dependences related to PEIs. This may or may not be optimized. The Specialized version exploits the information that there are no non-trivial exception handlers surrounding the procedure that may catch an exception possibly thrown by the procedure. Hence, any code region in the specialized version which does not have an exception handler for the region within the procedure, can be optimized while ignoring the write-barrier dependences, without violating the precise exception semantics. Both the Normal and Specialized versions will contain the additional parameter PEEH, as described in lines 403–408. Our preferred method transforms the specialized version further, as described below.

Further Transformation of Specialized Version

Figure 6:
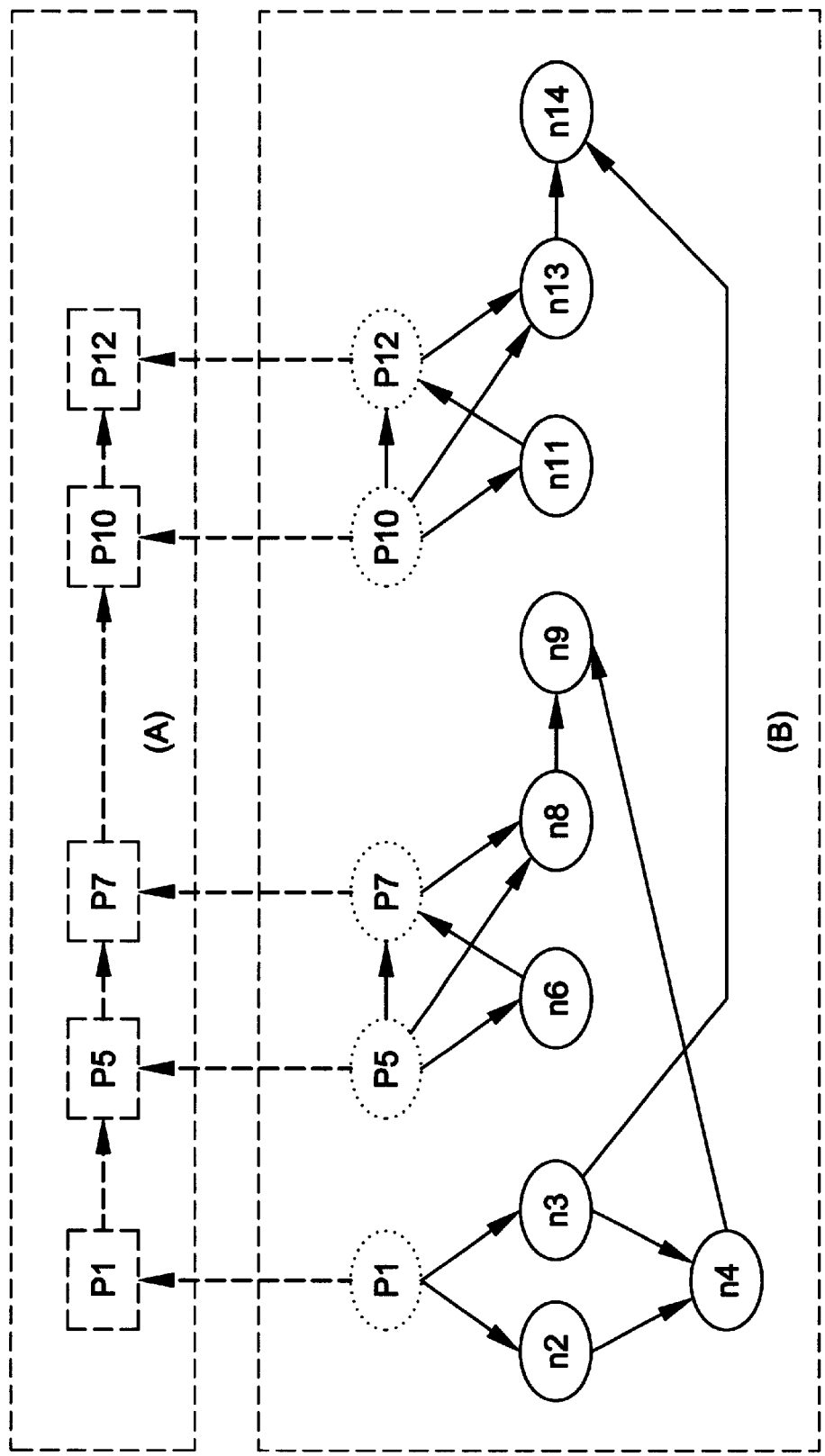
FIGS. 6A and 6B show the dependence graph for the invention.

The TransformSpecializedCode procedure in line 500 below performs the transformation of the specialized version of a given procedure m, so as to enable optimizations that can overcome exception-sequence dependences in addition to the write-barrier dependences. We use FIG. 6 to pictorially show the dependences between different statements for the program example described in FIG. 4.

```
500: TransformSpecializedCode(m) {
501:    Build dependence graph DepG for procedure m;
501:    Delete write-barrier dependences from DepG;
502:    Split each PEI_i node into two nodes: exception-monitor node em_i, and
        exception-generator node eg_i;
503:    Insert an exception-sequence edge from em_i to eg_i;
504:    foreach exception-sequence edge ese_ij from PEI_i to PEI_j do
505:       Remove ese_ij;
506:       Insert an exception-sequence edge from eg_i to eg_j;
507:    end do
508:    Generate exception-optimized code, called optimized code,
        from the DepG modified as above;
509:    Generate a copy of the optimized code, called compensation code;
510:    with optimized code:
511:       Remove code from all of the exception-generator nodes;
512:       Replace each exception-monitor node eg_i with the original PEI_i code;
513:    end with
514:    with compensation code
515:       Replace em_i code with code that sets boolean flag eflag_i to true if the
           exception check fails;
516:       Insert code that, if eflag_i is set to true, skips all the code in the dependence locus
           of em_i;
517:       Replace eg_i code with code that checks eflag_i and throws exception corresponding
           to PEI_i if eflag_i is set to true;
518:       Insert label LABEL_i immediately after the code corresponding to PEI_i in the
           optimized code;
519:    end with
520:    Create a catch block that catches any exception potentially thrown by the optimized
        code;
521:    with catch block
```

```
522:    Place the compensation code at the end of the catch block;
523:    Set all the eflags to false at the beginning of the catch block;
524:    Insert a code that
525:        (1) examines the exception e;
526:        (2) if thrown by PEI_i, sets eflag_i and branches to LABEL_i in the compensation
             code;
527:    end with
```

Step 501 deletes the write-barrier dependences, such as the edge from n9 to P10. Step 502 splits each PEI node $PEI_i$ into two nodes: an exception-monitor node $em_i$ and an exception-generator node $eg_i$. The exception monitor nodes appear in the optimized graph part of the dependence graph, while the exception generator nodes appear in the subgraph called the exception generator graph. FIG. 6B shows the optimized graph part of the dependence graph and FIG. 6A shows the exception generator graph, for the example in FIG. 4. Step 503 inserts an exception-sequence edge from an exception-monitor node to the corresponding exception-generator node. Then, each exception-sequence edge from PEIi to PEIj is deleted in the dependence graph, and instead, an exception-sequence edge is inserted from $eg_i$ to $eg_j$ in the graph. FIGS. 6A and 6B show the results of the operations performed according to steps 501 through 507. The edge from P1 in FIG. 6B to P1 FIG. 6A is an example of exception-sequence edge from an exception monitor node to the corresponding exception generator node.

Step 508 generates the optimized code using the optimized graph, and step 509 generates a copy of the optimized code to be used as the basis for the compensation code. The optimized code and the compensation code are identical, and shall access (read or write) the same memory location and registers.

Steps 510 through 513 describe modifications performed to the optimized code. First, code for the exception-generator nodes will be deleted from the optimized code. Then, code for the exception-monitor nodes will be replaced by the code from the original PEI nodes. Thus, effectively, the optimized code is generated as if the PEI nodes were never split, and the optimizations completely ignore all exception sequence dependences between PEI nodes.

Steps 514 through 519 describe modifications performed to the compensation code. First, code for each exception-monitor $em_i$ is replace with a code that sets $flag_i$ if the exception test fails (step 515). Also, additional code will be inserted that, if $flag_i$ is true, skips the execution of any statements in the dependence locus of $em_i$. Code for each exception-generator node $eg_i$ will be replaced with a code that checks $flag_i$ and throws exception if $eflag_i$ is set to true. Finally, a label $LABEL_i$ is inserted immediately after the code that corresponds to $PEI_i$ in the optimized code.

Step 520 places the optimized code in a try block and the compensation code in its catch block. When code for $PEI_i$ in the optimized code throws an exception, the catch block that contains the compensation code will be executed. Steps 521 through 527 describe modifications applied to the catch block for correct generation of the exception that would have been thrown had the optimized code not been optimized. Step 522 explains where to place the compensation code in the catch block. At the start of the catch block, step 523 ensures that all the eflag's are initialized to false. After the initialization, the handler examines the exception e thrown by the optimized code (step 525), and sets $flag_i$ corresponding to $PEI_i$ in the optimized code that threw the exception (step 526). Then, it branches to $LABEL_i$ in the compensation code to emulate a continued execution from $PEI_i$ in the optimized code (step 526).

Figure 5:
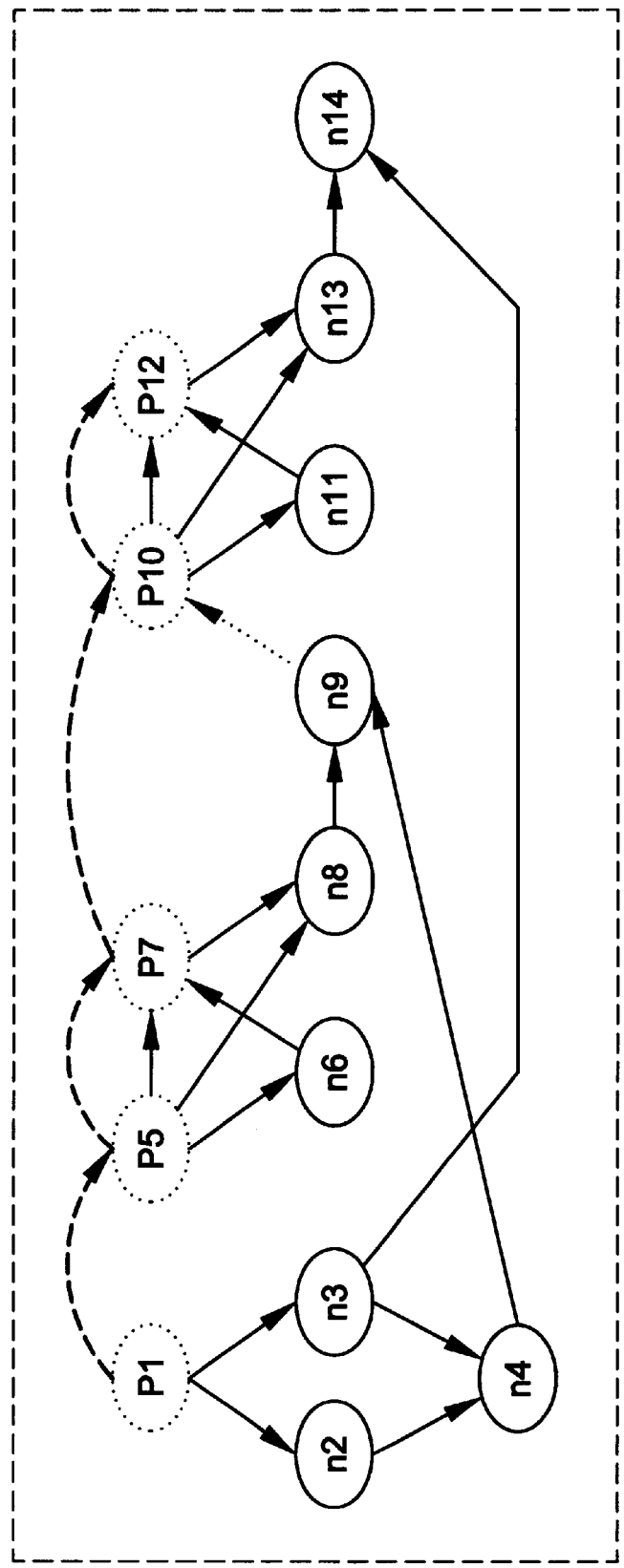
FIG. 5 shows a conventional dependence graph of the intermediate representation.

The effect of the above transformation of the specialized version of the procedure is that all exception-sequence dependences (in addition to write-barrier dependences in regions without a local exception handler) are ignored in the optimized version of the procedure, which results in fewer restrictions on code optimization. Referring back to the example program shown in FIG. 4, FIG. 6B shows the optimized graph, which shows the result of eliminating all the exception-sequence dependences from FIG. 5 by following our method. The longest paths (there are two) now have lengths of 4 each: P5, n6, P7, n8, n9; and P10, n11, P12, n13, n14. In contrast, when all write-barrier dependences and exception-sequence dependences constrain the program optimization, the longest path has length 10, as discussed above in the Background of the Invention section.

```
600:  m0() {
601:    try {
602:      BODY_A; // optimized code of m0 from the optimized graph
603:    } catch (...e) {
604:      // handler prologue
605:      all eflags = false;
606:      if (e is thrown by PEI1) {
607:        eflag_1 = true;
608:        branch to LABEL_1;
609:      } else if (e is thrown by PEI5) {
610:        eflag_5 = true;
611:        branch to LABEL_5;
612:      } else if (e is thrown by PEI7) {
613:        eflag_7 = true;
614:        branch to LABEL_7;
615:        ...
616:      }
617:      // Compensation code from (B) + (C).
```

```
618:      // Note that code for PEI5 has been code-motioned before PEI₁.
619:      ...
620:   LABEL₅: // start of code immediately after PEI₅ monitor in optimized code
621:      ...
622:   LABEL₁: // start of code immediately after PEI₁ monitor in optimized code
623:      ...
624:   if (eflag₁) throw exception(PEI₁);
625:      ...
626:   if (eflag₅) throw exception(PEI₅);
627:      ...
628:   LABEL₇: // start of code immediately after PEI₇ monitor in optimized code
629:      ...
630:   if (eflag₇) throw exception(PEI₇);
631:      ...
632:      }
633:   }
```

Lines 600 through 633 show a high-level view of the resulting code from the example of FIG. 4, with both the optimized code and the compensation code. Lines 601 through 603 show the placement of the optimized code in a try block, and lines 617 through 631 show the placement of the compensation code in the catch block. Step 605 initializes all the eflag's to false. Lines 606 through 616 show setting the corresponding eflag and branching to the corresponding LABEL in the compensation code, based on the exception thrown by the optimized code and caught by the catch block. Lines 620 and 622 show the locations (LABEL₅ and LABEL₁) immediately following the code corresponding to PEL₅ and PEI₁ in the optimized code. Lines 624, 626, and 630 show the code corresponding to the exception-generator nodes eg₁, eg₅, and eg₇.

Handling Multithreaded Programs

In order to deal with multithreaded programs, a preferred method takes the approach described below. It distinguishes between the following two cases. The first case is applicable when the code region being optimized is not inside a synchronized region and if the programming language supports weak consistency. In this case, our method does not constrain optimizations with any further write-barrier dependences. In all other situations (the second case), our method performs escape analysis on heap-allocated variables (as described in the U.S. patent application Ser. No. 09/323,989 filed on Jun. 2, 1999 in the names of J.-D. Choi, M. Gupta, S. Midkiff, M. J. Serrano, and V. C. Sreedhar, entitled "Method for optimizing locks in computer programs," the disclosure of which is incorporated herein by reference) and conventional liveness analysis of all other variables to conservatively identify the variables which are thread-local, i.e., variables which are only accessed by a single thread during their lifetime. Our method constrains code optimizations such that they honor write-barrier dependences between each PEI and writes of variables that are not thread-local. This ensures that even if the thread, in which an exception is thrown, is terminated, the program state visible to other threads remains valid, consistent with the precise exception semantics.

The final transformed program resulting from the method of this invention can be fed into other phases of a compiler, programming environment or program development tool for further manipulation, or it can be stored into a file for later retrieval, analysis or processing.

Alternative Embodiment

Our preferred embodiment described above computes $Dyn_c$ by capturing static information during the Initial Program Scan and then propagates this information dynamically by the code generated in lines 402–408. We now describe an alternative embodiment that performs the whole computation statically. The following pseudocode replaces the pseudocode of lines 401–410 in the preferred embodiment.

```
700:   CodeGeneration(G)
701:   Build call-graph, CallG, of program represented by G
702:   Perform EnclosingHandlerAnalysis(CallG)
703:   for each procedure, m, in program do
704:      if(h bit of EnclosingHandlersₘ is not set and there is no non-
             trivial local exception handler for exception type h) then
705:         optimize code ignoring write-barrier dependences for each
             PEI corresponding to h
706:      else
707:         generate code honoring write-barrier dependences for each
             PEI corresponding to h
708:      end if
709:   end do
```

Line 701 builds the call graph representation of the program. Line 702 performs an interprocedural analysis on this graph to identify the exception handlers that may dynamically enclose each procedure, and is described further below. Line 703 loops over each procedure in the program. Lines 704–708 check if the code region is not possibly enclosed in a non-trivial exception handler for a specific exception type—if so, all write-barrier dependences for that exception type are ignored while performing optimizations.

```
801: EnclosingHandlerAnalysis(CallGraph)
802:   for each procedure, m, in CallGraph do
803:      EnclosingHandlersₘ = 0
804:      foreach callsite, c, in m, do
805:         foreach handler, h, enclosing c do
806:            if (h bit of EEH_c is set)    // the bit is selectively set in InitialProgramScan
```

```
807:            markNodesWithEnclosingHandlers(CallGraph, n, h);
808:         end if
809:       end do
810:     end do
811: end do
```

The interprocedural analysis phase is presented in lines 801–811. This analysis associates with each procedure a bit vector called EnclosingHandlers, which keeps information for each relevant exception type whether there is a nontrivial enclosing exception handler. Lines 804–810 visit each call site and determine if the call site has a nontrivial handler enclosing it (as determined by lines 218–225 in the Initial-ProgramScan procedure). If it does, the procedures called at the call site (and procedures they call) have the h bit of their EnclosingHandlers bit-vector set. This step is performed by the code in lines 901–907 below. Line 903 sets the bit of the EnclosingHandlers variable for the given procedure, and lines 904–906 recursively set this bit for each callee procedure.

```
901: markNodesWithEnclosingHandlers(CallGraph, m, h)
902:   if(h bit of EnclosingHanders_m is not set) then
903:     set h bit of EnclosingHanders_m
904:     for each edge in CallGraph from m to callee do
905:       markNodesWithEnclosingHandlers(CallGraph, callee, h)
906:     end do
907: end if
```

Other Alternative Embodiments

In addition to the preferred embodiment and a main alternative embodiment, as described above, various modifications are now described.

An alternative embodiment of the method performs the transformation to eliminate exception-sequence dependences (described in TransformSpecializedCode pseudocode of lines 500–527) on both the specialized version (without write-barriers) and the normal version (with write-barriers) of the procedure, in order to get the benefits of overcoming exception-sequence dependences regardless of the need to preserve the values of variables at potential exception points in the procedure.

Another alternative embodiment skips the analysis described in line 302 of isNonTrivialHandler procedure in our preferred method. No liveness analysis of variables is performed on exception handlers or routines that handle uncaught exceptions. Instead, all variables that are visible to the exception handlers or user-defined routines that handle uncaught exceptions are assumed to be live at entry, and any information available about the liveness of variables at default routines handling uncaught exceptions is exploited. For example, in Java™, if the user code does not override the uncaughtException method of a thread group, the uncaughtException method of the system thread group is invoked by the Java™ Virtual Machine. Furthermore, this default uncaughtException method is known to be a trivial handler (hence, isNonTrivialHandler would return false) because it exits after printing the stack trace, i.e., it does not use the value of any variable visible to the user code (other than the exception variable) before the thread is terminated.

An alternative embodiment skips the analysis during the InitialProgramScan phase to identify the exceptions potentially thrown by the program (as described in lines 203–210 and lines 225–236). Instead, the bit vector Except represents a predefined set of important exceptions and dependences involving other exception types are always honored during optimized code generation. For example, for the Java™ language, this embodiment may select the set of unchecked exceptions predefined by the language as the set of exceptions for which the analysis about enclosing exception handlers is performed.

Another alternative embodiment limits the size of the bit vectors EEH, PEEH, and Except that are used to represent boolean information about the predefined exceptions. If the number of predefined exceptions exceeds the number of bits of a typical parameter, then a subset of these exceptions can be identified and the remaining exceptions can be summarized by 1 bit. The first subset should be 1 less than the number of bits available. The others are summarized (by performing a bitwise or) using the remaining bit.

An alternative embodiment can save storage by compressing the bit vector to 1 bit, which would represent any predefined exception. This can be computed by performing a bitwise or of the bits in the original bit vector. In another variant, an explicit extra parameter may not be required. Instead the single bit of information is encoded in an unused bit of an existing parameter. For example, the two least significant bits of a pointer field are not required on a machine with 4 byte words. Thus, any existing pointer parameter can be used to encode this information. In particular, virtual-method calls always pass a pointer to the object they operate on, called the this pointer, and thus, this parameter can be used to store the 1 bit of information.

An alternative embodiment modifies the manner in which the dynamic dispatch code is generated during code generation (described currently in line 407). Specifically, when generating the code to determine whether to call normal or specialized code, a decision is possibly made at code-generation time using an enhanced version of the static analysis described in alternative embodiment associated with lines 700–907. In these cases a direct call may occur, eliminating the need for dynamic dispatch code (line 407) for that call site. The enhanced static analysis additionally computes for each procedure whether all call sites to it have a call-path where some bit of an EEH is set to 1. This information records what will always occur. There are three cases:

A. If the bitwise and of the statically computed any information (computed by the alternative embodiment lines 700–907) for a call site and the called procedures bit vector, Except$_m$, is all zero then all calls can be made to the specialized version of the procedure. Thus, the need for dynamic dispatch is removed. Instead code is generated to make a direct call to the specialized procedure.

B. If the bitwise and of the statically computed always information for a call site and the called procedures bit vector, Except$_m$, is nonzero then all calls can be made to the normal version of the procedure. Thus, once again, the need for dynamic dispatch is removed. Instead code is generated to make a direct call to the normal version of the procedure.

C. If neither A nor B is applicable, then the dynamic dispatch code described in line 407 is generated. This static analysis occurs after the Initial Program Scan 105, but before the Code Generation phase 109.

Alternative embodiments of the method perform the analysis and transformations at run time, in a dynamic compiler. A variant of this embodiment does not create the compensation code, which ensures that the correct exception is thrown, during code generation time. It generates the compensation code only on demand, if an exception is thrown in the optimized code. Similarly, another variant of the method does not initially generate two versions of the procedure code in order to overcome the write-barrier dependences. It generates code for only the version (write-barrier-free or the original code) that will be executed, based on the expected information about liveness of variables at enclosing exception handlers for the given procedure call, and generates code for the other version on demand, if needed.

Another embodiment of the method computes and uses information about the set of live variables at entry to each exception handler at a finer granularity. Rather than simply checking if an exception handler is non-trivial (in which case, all variables visible to the exception handler are assumed to be live), this embodiment identifies the set of live variables for each exception handler. This embodiment imposes write-barrier dependences for each PEI separately, based on information about the set of variables that are live at the exception handler(s) for the exception possibly thrown by that PEI.

Thus, it should be understood that the preferred embodiment is provided as an example and not as a limitation. While the invention has been described in terms of a single preferred embodiment, with several variants, those skilled in the art will recognize that the invention can be practiced with modification within the spirit and scope of the appended claims.

What is claimed is:

1. A method of optimizing a computer program written in a language that supports exceptions with a constraint that a write statement can not be moved across a potentially excepting instruction, the method comprising the steps of:

identifying in the computer program a statement that writes into a variable and a statement corresponding to a potentially excepting instruction; and removing a constraint on moving the write statement across the potentially excepting instruction when the variable written by the write statement is determined not to be live at an exception handler that catches the exception when thrown.

2. The method of claim 1, wherein the removing step further comprises the steps of:

performing a liveness analysis of variables at entry to an exception handler in the computer program;

propagating information about the liveness of the variables at the exception handler surrounding an associated procedure call from a caller procedure to a callee procedure; and identifying a statement that writes into a variable which is not live at any exception handler which one of dynamically encloses a procedure as determined in the propagating step and surrounds the statement within a procedure as determined by locally analyzing a control flow structure in the procedure.

3. The method of claim 2, wherein the computer program is multithreaded.

4. The method of claim 3, wherein, if one of the programming language associated with the multithreadedeoimputer program supports strict consistency and a code region being optimized appears in a synchronized region of the computer program, then the method further comprises the steps of:

detecting thread-local variables; and imposing a constraint on a program transformation, wherein the imposed constraint includes avoiding moving a statement writing into a variable that is not thread-local across a potentially excepting instruction.

5. The method of claim 1, wherein the removing step further comprises the steps of:

checking an exception handler in the computer program portion to determine whether the exception handler is non-trivial, wherein the exception handler is non-trivial when a variable visible outside the exception handler, other than an exception variable, is live at the exception handler;

propagating information about a non-trivial exception handler surrounding a call site, from a caller to a callee using one or more parameters encoding this information;

creating a specialized version and a normal version of the code region being optimized which has no exception handler defined therein, wherein a write statement in the specialized version may be moved across potentially excepting instructions during optimizations and wherein a write statement in the normal version may not be moved across potentially excepting instructions during optimizations;

selecting the specialized version of the code region if a variable written therein is not live at an enclosing exception handler, wherein the variable is determined to be not live if there is no enclosing non-trivial exception handler as determined in accordance with the propagating step for an exception handler enclosing the procedure and in accordance with a local analysis for an exception handler enclosing the potentially excepting instruction within the procedure; and selecting the normal version otherwise.

6. The method of claim 5, wherein the propagating step propagates information within a compiler about the non-trivial exception handler surrounding a call site using the compiler's information about the caller-callee relationship.

7. The method of claim 5, further comprising the steps of:

transforming each code region to be optimized by performing optimizations without any constraints on ordering between potentially excepting instructions; and generating compensation code which executes only if an exception is thrown by the region transformed in the transforming step.

8. The method of claim 7, wherein the transforming step and compensation code generating steps are performed only on the specialized version of the code region.

9. The method of claim 1, wherein a determination of whether a variable is one of live and not live in the removing step comprises the steps of:

performing a liveness analysis of variables at entry to an exception handler in the computer program;

propagating information within a compiler about the liveness of the variable at exception handlers surrounding an associated call site to a callee procedure and a procedure transitively called from a called procedure using the compiler's information about a caller-callee relationship; and identifying for each potentially excepting instruction in a procedure a set of variables that is live at an enclosing exception handler for the exception, wherein the set of variables is determined in accordance with the propagating step for an exception handler enclosing the procedure and in accordance with a local analysis for an exception handler enclosing the potentially excepting instruction within the procedure.

10. The method of claim 1, wherein a determination of whether a variable is one of live and not live in the removing step comprises the steps of:

checking an exception handler in the computer program to determine whether the exception handler is non-trivial;

propagating information about a non-trivial exception handler surrounding a call site, from a caller to a callee using one or more parameters encoding this information; and identifying for each potentially excepting instruction in a procedure, a set of non-trivial enclosing exception handlers for an exception;

wherein the set of non-trivial exception handlers is determined in accordance with the propagating step for an exception handler enclosing the procedure and in accordance with a local analysis for an exception handler enclosing the potentially excepting instruction within the procedure, and further wherein, in a non-trivial exception handler, variables are treated as being live and, in a trivial exception handler, variables are treated as being not live.

11. The method of claim 1, wherein a determination of whether a variable is one of live and not live in the removing step comprises the steps of:

assuming a variable visible to the exception handler is live at an entry to an exception handler in code to be optimized; and using in a compiler, information about a live variable at a default exception handler invoked if the exception is not caught by a handler in the code.

12. The method of claim 1, wherein the removing step further comprises the steps of:

identifying exceptions potentially thrown by any instruction in the code region to be optimized;

checking an exception handler in the computer program to determine whether the exception handler is non-trivial;

propagating information about a non-trivial exception handler surrounding a call site, from a caller to a callee using one or more parameters encoding this information, and avoiding propagation of information about the liveness of a variable at an exception handler that does not catch an exception potentially thrown in the code region;

creating a specialized version and a normal version of the code region being optimized which has no exception handler defined therein, wherein a write statement in the specialized version may be moved across potentially excepting instructions during optimizations and wherein a write statement in the normal version may not be moved across potentially excepting instructions during optimizations;

selecting the specialized version of the code region if a variable written therein is not live at an enclosing exception handler, wherein the variable is determined to be not live if there is no enclosing non-trivial exception handler as determined in accordance with the propagating step for an exception handler enclosing the procedure and in accordance with a local analysis for an exception handler enclosing the potentially excepting instruction within the procedure; and selecting the normal version otherwise.

13. The method of claim 1, wherein the moving step further comprises the steps of:

identifying a predefined set of exceptions;

checking an exception handler in the computer program to determine whether the exception handler is non-trivial;

propagating information about a non-trivial exception handler surrounding a call site, from a caller to a callee using one or more parameters encoding this information, and avoiding propagation of information about the liveness of a variable at an exception handler that catches an exception not belonging to the predefined set;

creating a specialized version and a normal version of the code region being optimized which have no exception handler defined therein, wherein a write statement in the specialized version may be moved across potentially excepting instructions during optimizations and wherein a write statement in the normal version may not be moved across potentially excepting instructions during optimizations;

selecting the specialized version of the code region if a variable written therein is not live at an enclosing exception handler, wherein the variable is determined to be not live if there is no enclosing non-trivial exception handler as determined in accordance with the propagating step for an exception handler enclosing the procedure and in accordance with a local analysis for an exception handler enclosing the potentially excepting instruction within the procedure; and selecting the normal version otherwise.

14. A method of optimizing a computer program written in a language that supports exceptions, the method comprising the steps of:

transforming each code region to be optimized by performing optimizations without any constraints on ordering between potentially excepting instructions; and generating compensation code which executes only if an exception is thrown by the region transformed in the transforming step.

15. The method of claim 14, wherein the compensation code at least one of: (i) throws the same exception as the exception thrown by the procedure before the transformation; and (ii) does not throw an exception if the procedure before the transformation does not throw an exception.

16. The method of claim 14, wherein the step of generating compensation code is performed on demand by a run-time compiler, when an exception is thrown by the optimized code.

17. The method of claim 14, wherein the compensation code generating step further comprises:

creating a copy of the optimized code as compensation code, while keeping track of original placement of each potentially excepting instruction in the unoptimized code;

in the compensation code, replacing each newly placed potentially excepting instruction by code that, if an exception is thrown by that instruction, records that event to indicate that the exception would have been thrown, but does not throw the exception; and in the compensation code, at the original placement of each potentially excepting instruction, inserting code that checks if the event in the above step has been recorded, and if so, throws the corresponding exception.

18. The method of claim 14, further comprising the steps of:

splitting each potentially excepting instruction $PEI_i$, into two parts, an exception monitor $em_i$ and an exception generator $eg_i$;

adding an exception sequence dependence from $em_i$ to $eg_i$;

for each exception sequence dependence from original potentially excepting instruction $PEI_i$ to $PEI_j$, adding an exception sequence dependence from $eg_i$ to $eg_j$;

generating optimized code by performing optimizations without any ordering constraints between exception monitors;

creating a copy of optimized code to be used as compensation code, which is executed only if the optimized code throws an exception;

in the optimized code:

replacing each exception monitor $em_i$ by the corresponding original potentially excepting instruction $PEI_i$; and removing each exception generator $eg_i$;

in the compensation code:

replacing exception monitor $em_i$ with code that sets an associated exception event flag $ef_i$ to true if the exception is thrown by the original instruction $PEI_i$;

inserting code that, if $ef_i$ is set to true, skips code in the dependence locus of the corresponding exception monitor $em_i$;

replacing exception generator $eg_i$ with code that checks the corresponding flag $ef_i$ and throws the exception corresponding to $PEI_i$ if $ef_i$ is set to true;

inserting label $LAB_i$ immediately after the code corresponding to $em_i$;

inserting code at the beginning of compensation code to initialize all exception event flags to false, and then jump to the label $LAB_i$ corresponding to the exception $PEI_i$ thrown by the optimized code.

19. Apparatus for optimizing a computer program written in a language that supports exceptions with a constraint that a write statement can not be moved across a potentially excepting instruction, the apparatus comprising:

at least one processor operative to: (i) identify in the computer program a statement that writes into a variable and a statement corresponding to a potentially excepting instruction, and (ii) remove a constraint on moving the write statement across the potentially excepting instruction when the variable written by the write statement is determined not to be live at an exception handler that catches the exception when thrown.

20. Apparatus for optimizing a computer program written in a language that supports exceptions, the apparatus comprising:

at least one processor operative to: (i) transform each code region to be optimized by performing optimizations without any constraints on ordering between potentially excepting instructions, and (ii) generate compensation code which executes only if an exception is thrown by the region transformed in the transforming operation.

21. An article of manufacture for optimizing a computer program written in a language that supports exceptions with a constraint that a write statement can not be moved across a potentially excepting instruction, comprising a machine readable medium containing one or more programs which when executed implement the steps of:

identifying in the computer program a statement that writes into a variable and a statement corresponding to a potentially excepting instruction; and removing a constraint on moving the write statement across the potentially excepting instruction when the variable written by the write statement is determined not to be live at an exception handler that catches the exception when thrown.

22. An article of manufacture for optimizing a computer program written in a language that supports exceptions, comprising a machine readable medium containing one or more programs which when executed implement the steps of:

transforming each code region to be optimized by performing optimizations without any constraints on ordering between potentially excepting instructions; and generating compensation code which executes only if an exception is thrown by the region transformed in the transforming step.

23. A method of optimizing a computer program written in a language that supports exceptions with a constraint that a write statement can not be moved across a potentially excepting instruction, the method comprising the steps of:

identifying in the computer program a statement that writes into a variable and a statement corresponding to a potentially excepting instruction; and removing a constraint on moving the write statement across the potentially excepting instruction when the variable written by the write statement is determined not to be interprocedurally live at an exception handler that catches the exception when thrown.

24. A method of optimizing a computer program written in a language that supports exceptions, the method comprising the steps of:

transforming each code region to be optimized by performing optimizations without any constraints on ordering between potentially excepting instructions; and generating compensation code which executes only if an exception is thrown by the region transformed in the transforming step, wherein the compensation code generating step further comprises:

creating a copy of the optimized code as compensation code, while keeping track of original placement of each potentially excepting instruction in the unoptimized code;

in the compensation code, replacing each newly placed potentially excepting instruction by code that, if an exception is thrown by that instruction, records that event to indicate that the exception would have been thrown, but does not throw the exception; and in the compensation code, at the original placement of each potentially excepting instruction, inserting code that checks if the event in the above step has been recorded, and if so, throws the corresponding exception.

25. A method of optimizing a computer program written in a language that supports exceptions, the method comprising the steps of:

transforming each code region to be optimized by performing optimizations without any constraints on ordering between potentially excepting instructions;

generating compensation code which executes only if an exception is thrown by the region transformed in the transforming step;

splitting each potentially excepting instruction $PEI_i$, into two parts, an exception monitor $em_i$ and an exception generator $eg_i$;

adding an exception sequence dependence from $em_i$ to $eg_i$;

for each exception sequence dependence from original potentially excepting instruction $PEI_i$ to $PEI_j$, adding an exception sequence dependence from $eg_i$ to $eg_j$;

generating optimized code by performing optimizations without any ordering constraints between exception monitors;

creating a copy of optimized code to be used as compensation code, which is executed only if the optimized code throws an exception;

in the optimized code:
  replacing each exception monitor $em_i$ by the corresponding original potentially excepting instruction $PEI_i$; and
  removing each exception generator $eg_i$;

in the compensation code:
  replacing exception monitor $em_i$ with code that sets an associated exception event flag $ef_i$ to true if the exception is thrown by the original instruction $PEI_i$;
  inserting code that, if $ef_i$ is set to true, skips code in the dependence locus of the corresponding exception monitor $em_i$;
  replacing exception generator $eg_i$ with code that checks the corresponding flag $ef_i$ and throws the exception corresponding to $PEI_i$ if $ef_i$ is set to true;
  inserting label $LAB_i$ immediately after the code corresponding to $em_i$; and
  inserting code at the beginning of compensation code to initialize all exception event flags to false, and then jump to the label $LAB_i$ corresponding to the exception $PEI_i$ thrown by the optimized code.

* * * * *